US009749775B2

(12) United States Patent
Guerrero Ramirez et al.

(10) Patent No.: US 9,749,775 B2
(45) Date of Patent: Aug. 29, 2017

(54) SYSTEMS AND METHODS FOR WIRELESS COMMUNICATION TEST AUTOMATION

(71) Applicant: QUALCOMM Incorporated, San Diego, CA (US)

(72) Inventors: Juan Guerrero Ramirez, Farnborough (GB); Manmohan Rawat, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 14/738,809

(22) Filed: Jun. 12, 2015

(65) Prior Publication Data
US 2016/0323698 A1 Nov. 3, 2016

Related U.S. Application Data

(60) Provisional application No. 62/155,127, filed on Apr. 30, 2015.

(51) Int. Cl.
H04W 76/06 (2009.01)
H04W 4/00 (2009.01)
H04B 5/00 (2006.01)

(52) U.S. Cl.
CPC .............. H04W 4/008 (2013.01); H04B 5/00 (2013.01); H04W 76/06 (2013.01)

(58) Field of Classification Search
CPC ..................... G06K 7/10336; H04B 17/21
See application file for complete search history.

(56) References Cited

U.S. PATENT DOCUMENTS

| 6,404,218 | B1 | 6/2002 | Le et al. | |
|---|---|---|---|---|
| 8,401,543 | B2 | 3/2013 | Goja et al. | |
| 2003/0074153 | A1* | 4/2003 | Sugamori | G11C 29/56 702/122 |
| 2015/0093987 | A1* | 4/2015 | Ouyang | H04B 5/0043 455/41.1 |
| 2016/0134382 | A1* | 5/2016 | Mofidi | G06K 7/10336 455/41.1 |

FOREIGN PATENT DOCUMENTS

KR 20140094494 A 7/2014

OTHER PUBLICATIONS

Langer J., et al., "A Comprehensive Concept and System for Measurement and Testing Near Field Communication Devices," IEEE EUROCON, 2009, pp. 2052-2057.
NFC Forum, "Device Test Application Specification," DTA 1.2.2, NFCForum-CS-DeviceTestApplication, Feb. 4, 2012, 77 pages.
(Continued)

Primary Examiner — David Bilodeau
(74) Attorney, Agent, or Firm — Austin Rapp & Hardman

(57) ABSTRACT

A method by a near-field communication (NFC) device is described. The method includes receiving, at an NFC controller, an end of test response from a lower tester (LT) device that indicates completion by the LT device of an NFC Forum test case. The method also includes sending an end of test message from the NFC controller to a device host. The method further includes initiating, by the device host, a deactivation process for the LT device upon receiving the end of test message.

26 Claims, 9 Drawing Sheets

(56) References Cited

OTHER PUBLICATIONS

ECMA: "Standard ECMA-403: NFCIP-2 Test Methods, 1st Edition", Jun. 1, 2013 (Jun. 1, 2013), pp. 1-10, XP055282220, Retrieved from the Internet: URL:http://www.ecma-international.org/publications/files/ECMA-ST/ECMA-403.pdf [retrieved on Jun. 21, 2016] the whole document.
International Search Report and Written Opinion—PCT/US2016/023962—ISO/EPO—Jun. 29, 2016.
Stephan P-J: "Test Automation for NFC ICs using Jenkins and NUnit", 2015 IEEE Eighth International Conference On Software Testing, Verification and Validation Workshops (ICSTW), IEEE, Apr. 13, 2015 (Apr. 13, 2015), pp. 1-4, XP032776148, DOI: 10.1109/ICSTW.2015.7107414 [retrieved on May 13, 2015] the whole document.

* cited by examiner

SYSTEMS AND METHODS FOR WIRELESS COMMUNICATION TEST AUTOMATION

RELATED APPLICATIONS

This application is related to and claims priority from U.S. Provisional Patent Application Ser. No. 62/155,127, filed Apr. 30, 2015, for "SYSTEMS AND METHODS FOR WIRELESS COMMUNICATION TEST AUTOMATION."

TECHNICAL FIELD

The present disclosure relates generally to wireless communications. More specifically, the present disclosure relates to systems and methods for near-field communication (NFC) test automation.

BACKGROUND

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight and can be easily carried by users. More specifically, the portable wireless telephones, for example, further include cellular telephones that communicate voice and data packets over wireless networks. Many such cellular telephones are being manufactured with relatively large increases in computing capabilities, and as such are becoming tantamount to small personal computers and hand-held PDAs. Further, such devices are being manufactured to enable communications using a variety of frequencies and applicable coverage areas, such as cellular communications, wireless local area network (WLAN) communications, near-field communication (NFC), etc.

The interoperability of an NFC device may be tested by executing one or more NFC Forum test cases. When NFC Forum test cases are executed under automation, an NFC device and a lower tester (LT) device establish a communication link to perform an NFC Forum test case. Benefits may be realized by indicating that the NFC Forum test case has completed and deactivating the communication link.

SUMMARY

A method by a near-field communication (NFC) device is described. The method includes receiving, at an NFC controller, an end of test response from a lower tester (LT) device that indicates completion by the LT device of an NFC Forum test case. The method also includes sending an end of test message from the NFC controller to a device host. The method further includes initiating, by the device host, a deactivation process for the LT device upon receiving the end of test message.

The method may be performed during NFC Forum test case execution under automation. A test suite of NFC Forum test cases may be executed with automation implemented.

The end of test response may be received from the LT device in response to sending a start of test message from the NFC device. The LT device may execute the NFC Forum test case upon receiving the start of test message and may send the end of test response upon completing the NFC Forum test case. The end of test response may include a data exchange protocol (DEP) response end of transmission (DEP_RESP(EOT)) message.

The deactivation process may include releasing an NFC-DEP link with the LT device and entering idle mode. Performing the NFC-DEP deactivation may include sending a deactivation request to the LT device in response to receiving the end of test response from the LT device.

The method may also include indicating to the LT device that the NFC device is ready to start a next NFC Forum test case upon completing the deactivation process with the LT device and entering idle mode.

The NFC Forum test case may include a test to verify that the NFC device is compliant with NFC Forum technical specifications.

A near-field communication (NFC) device is also described. The NFC device includes a processor, memory in electronic communication with the processor, and instructions stored in the memory. The instructions are executable by the processor to receive, at an NFC controller, an end of test response from a lower tester (LT) device that indicates completion by the LT device of an NFC Forum test case. The instructions are also executable to send an end of test message from the NFC controller to a device host. The instructions are further executable to initiate, by the device host, a deactivation process for the LT device upon receiving the end of test message.

A method by a LT device is also described. The method includes sending an end of test response to an NFC device upon completion by the LT device of an NFC Forum test case. The method also includes receiving a deactivation request from the NFC device based on the end of test response. The method further includes initiating a deactivation process with the NFC device upon receiving the deactivation request.

The method may be performed during NFC Forum test case execution under automation. A test suite of NFC Forum test cases may be executed with automation implemented.

The end of test response may be sent from the LT device in response to receiving a start of test message from the NFC device. The LT device may execute the NFC Forum test case upon receiving the start of test message and may send the end of test response upon completing the NFC Forum test case. The end of test response may include a DEP_RESP (EOT) message.

The deactivation process may include releasing an NFC-DEP link with the NFC device and entering idle mode.

The method may also include indicating to the NFC device that the LT device is ready to start a next NFC Forum test case upon completing the deactivation process with the NFC device and entering idle mode.

An LT device is also described. The LT device includes a processor, memory in electronic communication with the processor, and instructions stored in the memory. The instructions are executable by the processor to send an end of test response to a NFC device upon completion by the LT device of an NFC Forum test case. The instructions are also executable to receive a deactivation request from the NFC device based on the end of test response. The instructions are further executable to initiate a deactivation process with the NFC device upon receiving the deactivation request.

DETAILED DESCRIPTION

The detailed description set forth below in connection with the appended drawings is intended as a description of exemplary implementations of the disclosure and is not intended to represent the only implementations in which the disclosure may be practiced. The term "exemplary" used throughout this description means "serving as an example, instance or illustration," and should not necessarily be construed as preferred or advantageous over other exemplary implementations. The detailed description includes specific details for the purpose of providing a thorough understanding of the exemplary implementations of the disclosure. In some instances, some devices are shown in block diagram form.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
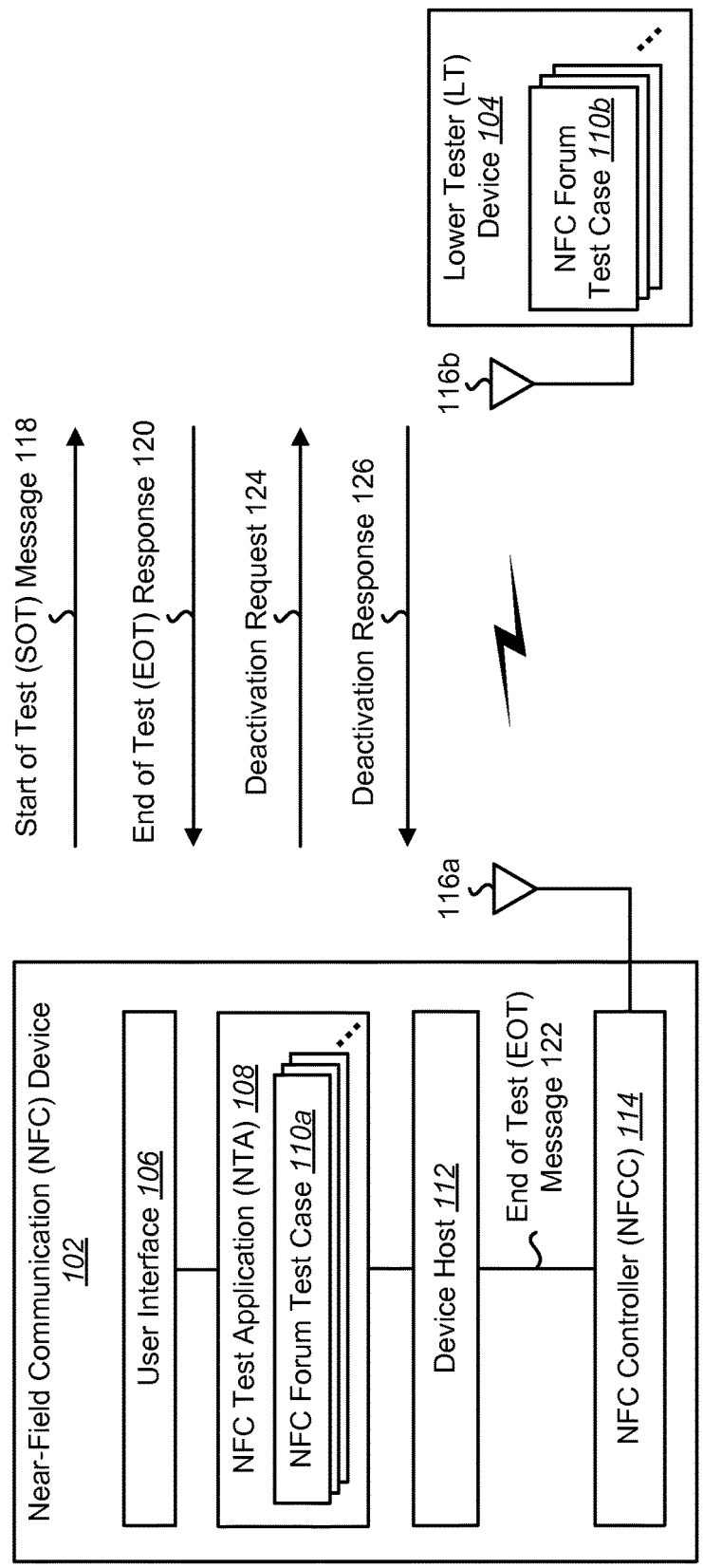
FIG. 1 is a block diagram illustrating one configuration of a near-field communication (NFC) device and a lower tester (LT) device.

FIG. 1 is a block diagram illustrating one configuration of a near-field communication (NFC) device 102 and a lower tester (LT) device 104. The NFC device 102 may be a wireless communication device that communicates with the LT device 104 using NFC protocols. NFC is an inductively coupled communication technology. Therefore, the NFC device 102 and the LT device 104 may also be referred to as an inductively coupled communication devices.

In the context of NFC, there are two devices communicating: an initiator and a target. The NFC device 102 may be either an initiator or a target depending on the context. The antenna 116 of an initiator NFC device produces a radiated field (also referred to as a magnetic field or an electromagnetic field) that is received by the antenna 116 of the target NFC device. An initiator NFC device may also be referred to as a poller, polling device, reader or initiator. A target NFC device may also be referred to as a listener, listening device or target.

The NFC device 102 and the LT device 104 may use one or more NFC signaling technologies to communicate. The NFC signaling technologies may include NFC type-A, NFC type-B and NFC type-F. The NFC signaling technologies differ in the modulation schemes employed.

NFC has a number of different tag types supporting a subset of the NFC signaling technologies. For example, Type 1 tags (T1T) use NFC type-A communication without data collision protection. Type 2 tags (T2T) use NFC type-B communication with anti-collision. Type 3 tags (T3T) use NFC type-F with anti-collision. Type 4 tags (T4T) can use either NFC type-A (T4AT) or NFC type-B (T4BT) with anti-collision.

In one configuration, the NFC device 102 and the LT device 104 may be operable to communicate using NFC through various interfaces, such as a frame RF interface, ISO-data exchange protocol (DEP) RF interface and NFC-DEP RF interface. In another configuration, the NFC device 102 and the LT device 104 may establish an NFC-DEP RF protocol-based communication link with link layer connections defined through a logical link control protocol (LLCP). In still another configuration, the NFC device 102 and the LT device 104 may be operable to be connected to an access network and/or core network (e.g., a CDMA network, a GPRS network, a UMTS network, and other types of wireline and wireless communication networks).

The LT device 104 acting as a reader may poll for nearby NFC devices 102. The NFC device 102 may begin to listen when it comes within a few centimeters of the LT device 104. The LT device 104 will then communicate with the NFC device 102 in order to determine which signaling technologies can be used. In an example, a user may place an NFC device 102 in the vicinity of the LT device 104 to execute NFC Forum test cases 110.

The LT device 104 may generate an RF field to communicate with the NFC device 102. For example, the LT device 104 may generate the RF field using transmitter and an NFC antenna 116b. The NFC device 102 may modulate the RF field to send a signal (e.g., data) to the LT device 104. Once the NFC device 102 receives that signal, the LT device 104 may transmit a continuous wave to maintain the RF field. The continuous wave may have a carrier frequency. In the case of NFC, the carrier frequency may be 13.56 megahertz (MHz).

The NFC device 102 may include an NFC controller (NFCC) 114. The NFCC 114 may implement inductively coupled communication using NFC protocols. For example, the NFCC 114 may establish an NFC-DEP RF protocol-based communication link with the LT device 104 to exchange information. The NFCC 114 may be coupled to a device host 112 and an antenna 116a. The NFCC 114 may also be referred to as an NFC card or NFC chip.

The device host 112 may generally perform operations on the NFC device 102. One example of the device host 112 includes a processor and memory, where the processor runs an operating system. Examples of operating systems that may be run by the device host 112 include Android, iOS, Windows Phone, Windows RT and Blackberry. The device host 112 may be operable to communicate, through the NFCC 114, with a remote NFC endpoint.

The NFC Forum has defined a number of test cases 110 to verify that an NFC device 102 is compliant with the NFC technical specifications. The NFC device 102 may include an NFC test application (NTA) 108 that implements one or more NFC Forum test cases 110a. The NTA 108 may be a module that runs above the device host 112 to perform testing of the NFC device 102. The NTA 108 may execute the NFC Forum test cases 110 to test whether the NFCC 114 is compliant with NFC Forum interoperability standards.

When performing an NFC Forum test case 110a, the NTA 108 may send and receive commands to/from the NFCC 114 via the device host 112. For example, upon initiating a NFC Forum test case 110a, the NTA 108 may send a start of test (SOT) message to the device host 112, which forwards the SOT message to the NFCC 114. The NFCC 114 then interacts with the LT device 104. For example, the NFCC 114 may send an SOT message 118 to the LT device 104. The NFC device 102 may then perform the NFC Forum test case 110a. The NTA 108 waits for the response from the LT device 104. The response indicates whether the NFCC 114 passes or fails based on comparing the sequences of what was sent to what was received. Upon receiving the SOT message 118, the LT device 104 executes the NFC Forum test case 110b.

In one configuration, the NTA 108 may be coupled to a user interface 106. The user interface 106 may be a graphical user interface (GUI) that provides a mechanism for a user to initiate the execution of the NFC Forum test cases 110. A test suite of NFC Forum test cases 110 may be executed by the user interface 106. The test suite may have different patterns and modes. A test suite includes a number of NFC Forum test cases 110 that should be executed. The user interface 106 may provide flexibility for users to choose different patterns or modes of testing.

The remote lower tester (LT) device 104 may implement corresponding NFC Forum test cases 110b with the NFC device 102. The LT device 104 may be an NFC-configured device that may execute NFC Forum test cases 110b with an NFC device 102. In one configuration, the LT device 104 may be an NFC reader. The LT device may also be referred to as an NFC Forum standards network simulator or an NFC standard network equipment.

In one case, an NFC Forum test case 110 may be run by an NFC Forum-certified equipment vendor or manufacturer. These vendors or manufacturers may be approved by the NFC Forum body. The goal of the NFC Forum test cases 110b is to ensure the interoperability of an NFC device 102 with other NFC-configured devices.

During execution of NFC Forum test cases 110, the NFC device 102 and the LT device 104 may establish an NFC link. This link may be an NFC-DEP RF protocol-based communication link. The LT device 104 will go through a technical NFC test application (NTA) protocol and check various requirements one-by-one. If an NFC device 102 under test can pass all these NFC Forum test cases 110, the NFC device 102 is determined to be interoperable other NFC-configured devices. Therefore, to be compliant with NFC Forum standards, a vendor or manufacturer of an NFC device 102 may need to pass these NFC Forum test cases 110 before going to market.

Currently there are two approaches to execute a test suite of NFC Forum test cases 110. In one approach, the test suite is executed without automation implemented. In this approach each NFC Forum test case 110 in a test suite may be executed independently.

In another approach, the test suite of NFC Forum test cases 110 is executed with automation implemented. In this approach, the NFC Forum test cases 110 may be executed automatically, one after the other. It has been proposed by NFC Forum device requirement 1.3 that all NFC Forum-compliant NFC devices 102 will be required to execute NFC Forum test cases 110 with automation implemented.

In some cases, NFC Forum test cases 110 may fail to execute properly when executed using automation. A reason for this is because an NFC Forum test case 110 may not be sufficiently defined in order to follow the NFC Forum device requirement 1.3.

According to NFC Forum standards, when an NFC device 102 completes an NFC Forum test case 110a, the NFC device 102 must follow a procedure to recover the link with the LT device 104 and be ready for the next NFC Forum test case 110a. Currently, this procedure may take around 25 seconds. However, while the NFC device 102 is performing this procedure, the LT device 104 may have proceeded with the next NFC Forum test case 110b without the NFC device 102 being ready. This may lead to a failure of the NFC Forum test case 110.

The NFC device 102 may never complete its current procedure for the NFC Forum test cases 110a. The NFC device 102 may go into a different state and fail all the other NFC Forum test cases 110a. According to current NFC Forum standards, the LT device 104 does not signal to the NFC device 102 that it has completed its NFC Forum test case 110b. Because the NFC device 102 never gets a response from the LT device 104 that the LT device 104 has finished its NFC Forum test case 110a, the NFC device 102 may wait for the LT device 104 to respond before going to the next NFC Forum test case 110a. However, the LT device 104 may proceed with the next NFC Forum test case 110b. Therefore, the NFC device 102 and the LT device 104 may be in an unsynchronized state.

Without the LT device 104 indicating to the NFC device 102 that it has completed the NFC Forum test case 110b, the NFC device 102 does not have a graceful way to exit the link with the LT device 104 and start the next NFC Forum test case 110a. An example of this problem is described in connection with FIG. 4.

Some examples of the NFC Forum test cases 110 that are impacted by this problem are included in Table (1).

TABLE (1)

| NFC Forum test cases that fail under automation |
|---|
| TC_POL_NFCA_P2P_BV_3: All Subcases |
| TC_POL_NFCA_P2P_BV_5: All Subcases |
| TC_POL_NFCA_P2P_BV_6: All Subcases |
| TC_POL_NFCA_P2P_BV_10: All Subcases |
| TC_POL_NFCA_P2P_BV_11: All Subcases |
| TC_POL_NFCF_P2P_BV_3: All Subcases |
| TC_POL_NFCF_P2P_BV_4: All Subcases |
| TC_POL_NFCF_P2P_BV_5: All Subcases |
| TC_POL_NFCF_P2P_BV_6: All Subcases |
| TC_POL_NFCA_P2P_BV_10: All Subcases |
| TC_POL_NFCA_P2P_BV_11: All Subcases |

It should be noted that while Table (1) lists some of the NFC Forum test cases 110 that may fail under automation, other current or future NFC Forum test cases 110 may also fail to execute properly under automation.

In one example, the NFC Forum test case 110 TC_POL_NFCA_P2P_BV_6_x finishes with the NFC device 102 sending the following start of test message 118: 'D4'+'06'+'03' (PFB)+'00 01 02 . . . 07'. After sending this start of test message 118, the NFC Forum test case 110a finishes. The NFC device 102 has to complete the communication with the LT device 104. However, the LT device 104 may have moved on to the next NFC Forum test case 110 and may not acknowledge the attempts made by the NFC device 102 to deactivate the link. The NFC device 102 may have to wait to gracefully deactivate the link with the LT device 104.

A significant disadvantage of the current implementation of NFC Forum test cases 110 with automation is that time is wasted and battery power is consumed. As shown above, there are multiple NFC Forum test cases 110 that should be corrected in order to improve timing execution.

The described systems and methods may correct NFC Forum test cases 110 that are impacted by the automation problems. To accomplish this, the LT device 104 may be configured to send an end of test (EOT) response 120 upon completion of an NFC Forum test case 110b.

This EOT response 120 may be received by the NFCC 114 of the NFC device 102. The EOT response 120 may indicate completion by the LT device 104 of an NFC Forum test case 110b. In one configuration, the EOT response 120 may be a DEP_RESP(EOT) message. The EOT response 120 may be received from the LT device 104 in response to sending the SOT message 118 from the NFC device 102.

The NFCC 114 may pass an EOT message 122 to the device host 112. The EOT message 122 may indicate to the device host 112 that the LT device 104 has finished executing the NFC Forum test case 110b.

Upon receiving the EOT message 122, the device host 112 may initiate a deactivation process with the LT device 104. This deactivation process may include releasing the NFC-DEP link between the LT device 104 and the NFC device 102 and entering idle mode. The device host 112 may instruct the NFCC 114 to transition to idle mode.

Upon receiving this instruction to enter idle mode, the NFCC 114 may send a deactivation request 124 to the LT device 104. This deactivation request 124 may be a RELEASE_REQ.DESELECT_REQ message. The deactivation request 124 may indicate to the LT device 104 that the NFC device 102 is ready to start the next NFC Forum test case 110a after completing the deactivation process with the LT device 104 and entering idle mode.

Upon receiving the deactivation request 124 from the NFCC 114, the LT device 104 may send a deactivation response 126 back to the NFCC 114. This deactivation response 126 may be a RELEASE_RESP.DESLECT_RESP message. The deactivation response 126 may indicate to the NFC device 102 that the LT device 104 is ready to start the next NFC Forum test case 110b after completing the deactivation process with the NFC device 102 and entering idle mode. Both the NFC device 102 and the LT device 104 may release the NFC-DEP link and enter idle mode.

On completion of the transition to idle mode, both the LT device 104 and the NFC device 102 may start the next NFC Forum test case 110. An example of this approach is described in connection with FIG. 5. This approach may complete in milliseconds, thus avoiding delays in executing the NFC Forum test cases 110 when automation is implemented.

In the example for the NFC Forum test case 110 TC_POL_NFCA_P2P_BV_6_x, this test case may finish with the following command exchange. The NFC device 102 may send the start of test message 118 in the form of 'D4'+'06'+'0X'(PFB)+'00 01 02 . . . 07'. This start of test message 118 may be a DEP_REQ(SOT) message. The LT device 104 may send an EOT response 120 in the form of 'D5'+'07'+'0X'(PFB)+'FF FF FF 01 02'. This EOT response 120 may be a DEP_RESP(EOT) message. The NFC device 102 may send a deactivation request 124 in the form of 'D4'+'0A'. This deactivation request 124 may be a RELEASE_REQ.DESELECT_REQ message. The LT device 104 may send a deactivation response 126 in the form of 'D5'+'0B'. This deactivation response 126 may be a RELEASE_RESP.DESLECT_RESP message.

The described systems and methods result in a more agile execution of the NFC Forum test cases 110 that executes more quickly and provides more battery efficiency. According to this approach, the time to finish the test cases typically takes milliseconds instead of approximately 30 seconds.

Figure 2:
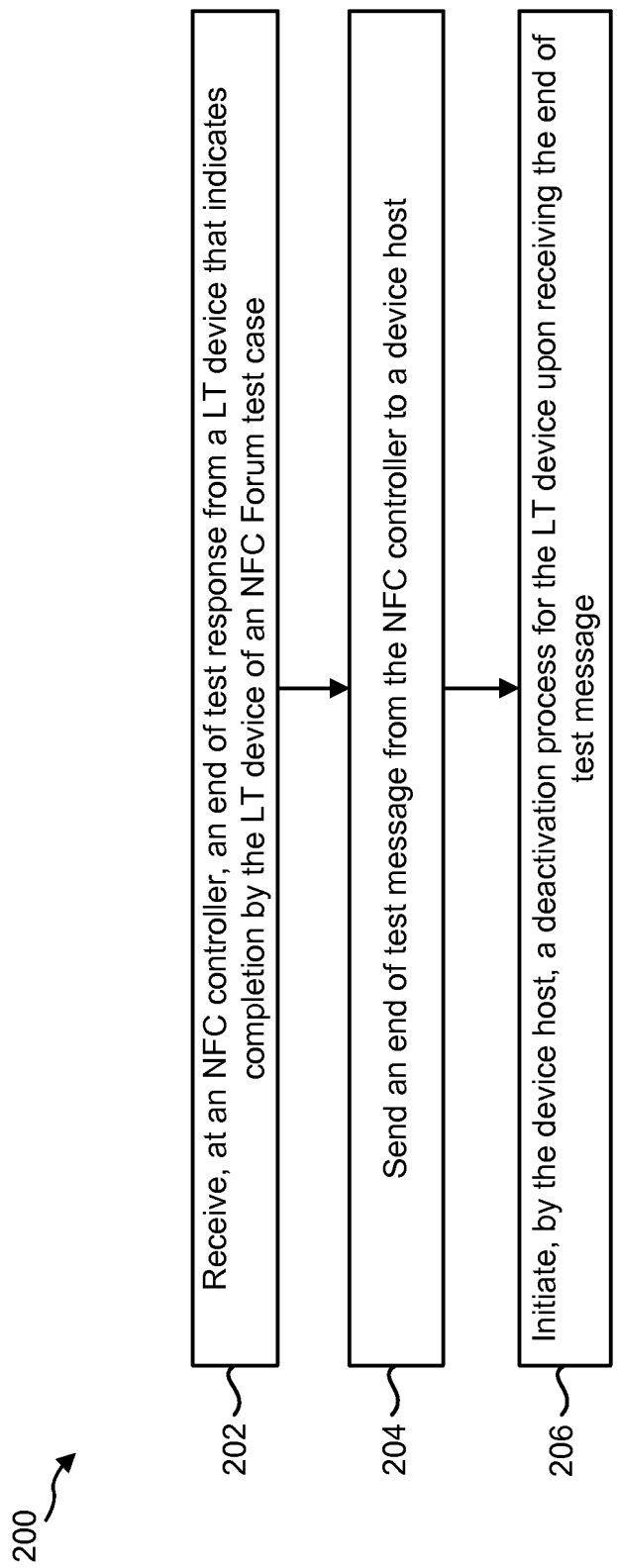
FIG. 2 is a flow diagram illustrating a method for performing NFC Forum test cases under automation by an NFC device.

FIG. 2 is a flow diagram illustrating a method 200 for performing NFC Forum test cases 110 under automation by an NFC device 102. The method 200 may be performed by the NFC device 102 to execute a test suite of NFC Forum test cases 110 with automation implemented.

The NFC device 102 may include an NFC controller (NFCC) 114 and a device host 112. An NFC test application (NTA) 108 may implement NFC Forum test cases 110 between the NFC device 102 and a lower tester (LT) device 104. The NFC device 102 and LT device 104 may establish an NFC-DEP link.

The NFC controller 114 may receive 202 an end of test (EOT) response 120 from the lower tester (LT) device 104 that indicates completion by the LT device 104 of an NFC Forum test case 110. The EOT response 120 may be received from the LT device 104 in response to the NFC device 102 sending a start of test (SOT) message 118 to the LT device 104. The LT device 104 may execute the NFC Forum test case 110 upon receiving the SOT message 118. The LT device 104 may send the EOT response upon 120 completing the NFC Forum test case 110b.

Upon receiving the EOT response 120 from the LT device 104, the NFCC 114 may send 204 an EOT message 122 to the device host 112. The EOT message 122 may indicate to the device host 112 that the LT device 104 has finished executing the NFC Forum test case 110b.

The device host 112 may initiate 206 a deactivation process for the LT device 104 upon receiving the EOT message 122. The deactivation process may include releasing the NFC-DEP link with the LT device 104 and entering idle mode. The device host 112 may instruct the NFCC 114 to enter idle mode. Upon receiving this instruction, the NFCC 114 may send a deactivation request 124 to the LT device 104 to deactivate the NFC-DEP link.

Figure 3:
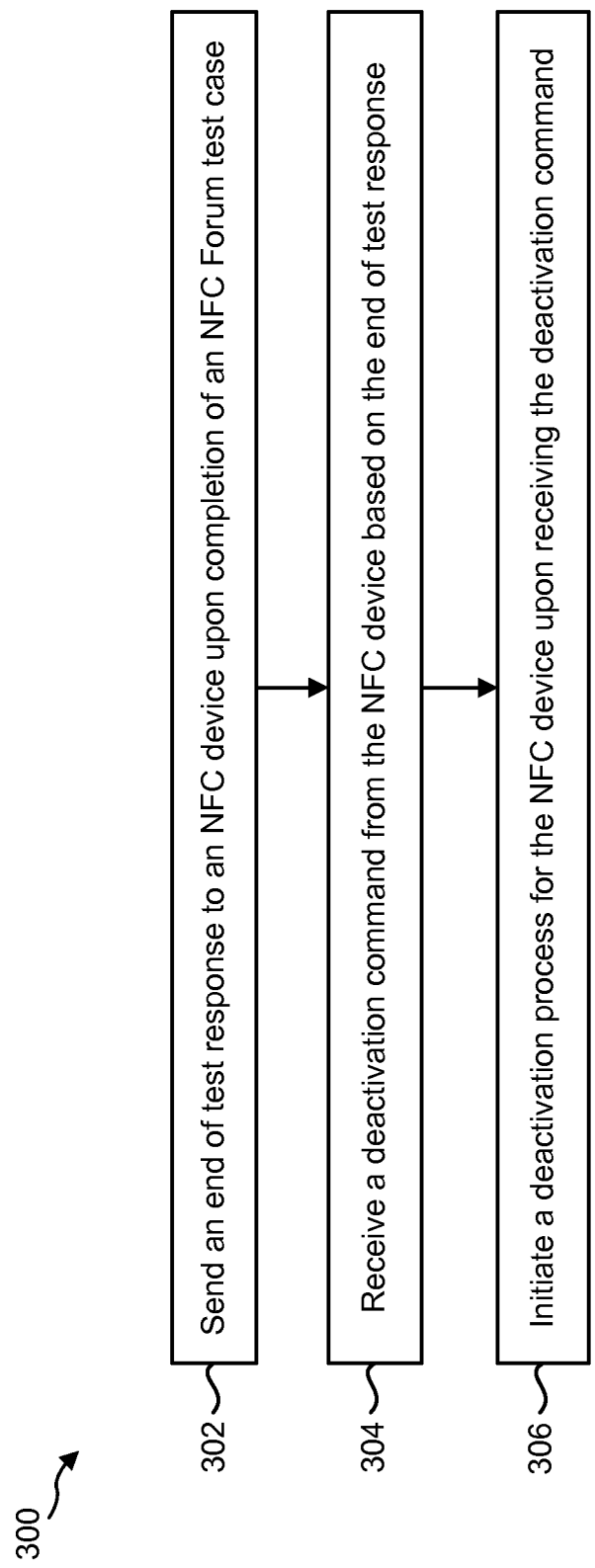
FIG. 3 is a flow diagram illustrating a method for performing NFC Forum test cases under automation by an LT device.

FIG. 3 is a flow diagram illustrating a method 300 for performing NFC Forum test cases 110 under automation by an LT device 104. The method 300 may be performed by the LT device 104 to execute a test suite of NFC Forum test cases 110 with automation implemented. The LT device 104 may establish an NFC-DEP link with an NFC device 102 to execute an NFC Forum test case 110.

The LT device 104 may send 302 an EOT response 120 to the NFC device 102 upon completion of an NFC Forum test case 110b. The EOT response 120 may indicate to the NFC device 102 that the LT device 104 has finished executing the NFC Forum test case 110b.

The EOT response 120 may be sent from the LT device 104 in response to the NFC device 102 sending a start of test (SOT) message 118 to the LT device 104. The LT device 104 may execute the NFC Forum test case 110b upon receiving the SOT message 118. The LT device 104 may send the EOT response 120 upon completing the NFC Forum test case 110b.

The LT device 104 may receive 304 a deactivation request 124 from the NFC device 102 based on the EOT response 120. The deactivation request 124 may indicate to the LT device 104 that the NFC device 102 is ready to start the next NFC Forum test case 110a after completing a deactivation process. The NFC device 102 may send the deactivation request 124 to the LT device 104 in response to the LT device 104 sending the EOT response 120.

The LT device 104 may initiate 306 the deactivation process for the NFC device 102 upon receiving the deactivation request 124. The deactivation process may include releasing the NFC-DEP link with the NFC device 102 and entering idle mode. Upon receiving the deactivation request 124 from the NFC device 102, the LT device 104 may send a deactivation response 126 back to the NFC device 102. The deactivation response 126 may indicate to the NFC device 102 that the LT device 104 is ready to start the next NFC Forum test case 110*b* after completing the deactivation process with the NFC device 102.

Figure 4:
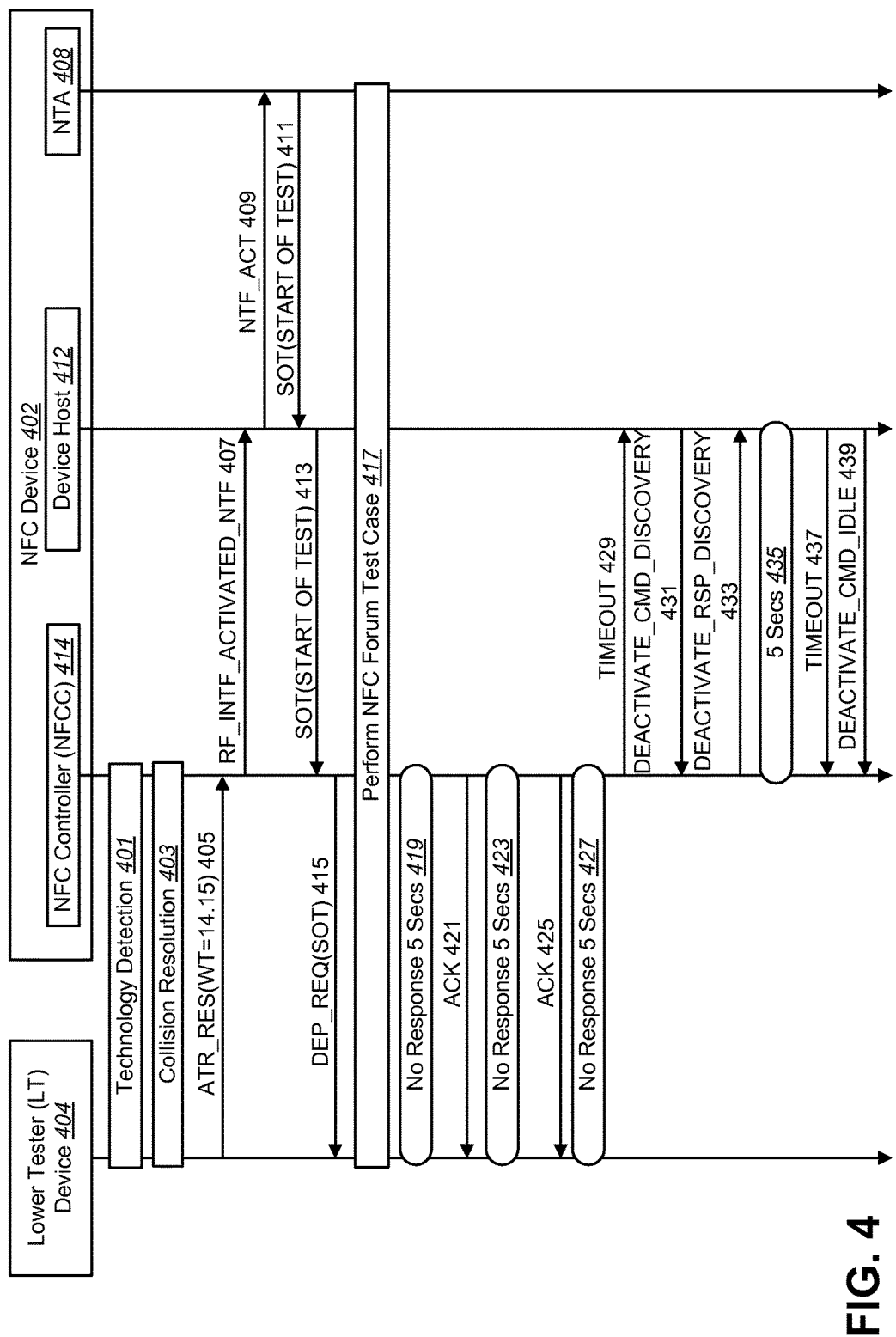
FIG. 4 is a sequence diagram illustrating one approach for performing NFC Forum test cases.

FIG. 4 is a sequence diagram illustrating one approach for performing NFC Forum test cases 110. In particular, FIG. 4 illustrates problems associated with implementing NFC Forum test cases 110 with automation according to current NFC Forum standards.

A lower tester (LT) device 404 may communicate with an NFC device 402 that includes an NFC controller (NFCC) 414, a device host 412 and an NFC test application (NTA) 408. The NFCC 414 and the LT device 404 may establish an NFC link. In one configuration, the NFC link may be an NFC-DEP link.

The LT device 404 and the NFCC 414 may perform 401 technology detection. For example, the LT device 404 may poll the NFCC 414 to determine which NFC signaling technology (e.g., NFC type-A, NFC type-B and NFC type-F, etc.) the NFC device 402 supports. The LT device 404 and the NFCC 414 may perform 403 collision resolution to avoid interference caused by two or more targets or initiators during the same time period.

The LT device 404 may send 405 an attribute response (ATR_RES) to the NFCC 414. The ATR_RES may indicate a waiting time (WT). In one configuration, the WT may be 14.15 seconds. The NFCC 414 may send 407 an RF interface activation notification (RF_INTF_ACTIVATED_NTF) to the device host 412. The device host 412 may send 409 an activation notification (NTF_ACT) to the NTA 408.

Upon receiving the NTF_ACT, the NTA 408 may initiate execution of the NFC Forum test case 110*a*. The NTA 408 may send 411 a start of test (SOT) message to the device host 412, which sends 413 the SOT message to the NFCC 414.

The NFCC 414 may format the SOT message for NFC-DEP and send 415 an SOT message 118 as a DEP request message (DEP_REQ(SOT)). At this point, the NFC device 402 and the LT device 404 may perform 417 the NFC Forum test case. Upon completion of the NFC Forum test case, the LT device 404 may indicate PASS. However, because the WT is 14.15 seconds, the NFC device 402 still has to complete the communication with the LT device 404 gracefully. Meanwhile, the LT device 404 may start the next NFC Forum test case 110*b*.

The NFCC 414 may not receive 419 a response from the LT device 404 after 5 seconds. The NFCC 414 may send 421 an acknowledgment (ACK) to the LT device 404 based on the NFC Forum digital protocol (DP) specification. The NFCC 414 may still not receive 423 a response from the LT device 404 after another 5 seconds. The NFCC 414 may send 425 another ACK to the LT device 404. Upon not receiving 427 a response after another 5 seconds, a timeout is declared and the NFCC 414 may send 429 a timeout message (TIMEOUT) to the device host 412.

Upon receiving the timeout message, the device host 412 may send 431 a deactivate discovery command (DEACTIVATE_CMD_DISCOVERY) to the NFCC 414. The deactivate discovery command may instruct the NFCC 414 to deactivate the NFC-DEP link and perform discovery for the LT device 404. The NFCC 414 may send 433 a deactivation and discovery response back to the device host 412.

Because the LT device 404 is performing the next NFC Forum test case, the NFC device 402 may not receive a response from the LT device 404. After not receiving 435 a response from the LT device 404, the device host 412 sends 437 a timeout message (TIMEOUT) to the NFCC 414. The device host 412 may send 439 a deactivate idle message (DEACTIVATE_CMD_IDLE) instructing the NFCC 414 to enter idle mode.

At this point, the NFC device 402 may perform polling again. In this case, this process may take 20 seconds minimum. However, the LT device 404 started the next sequence of NFC Forum test cases approximately 19 seconds earlier. Therefore, the subsequent test by the LT device 404 is not ready to start in automation. This leads to failure of the NFC Forum test case 110.

Figure 5:
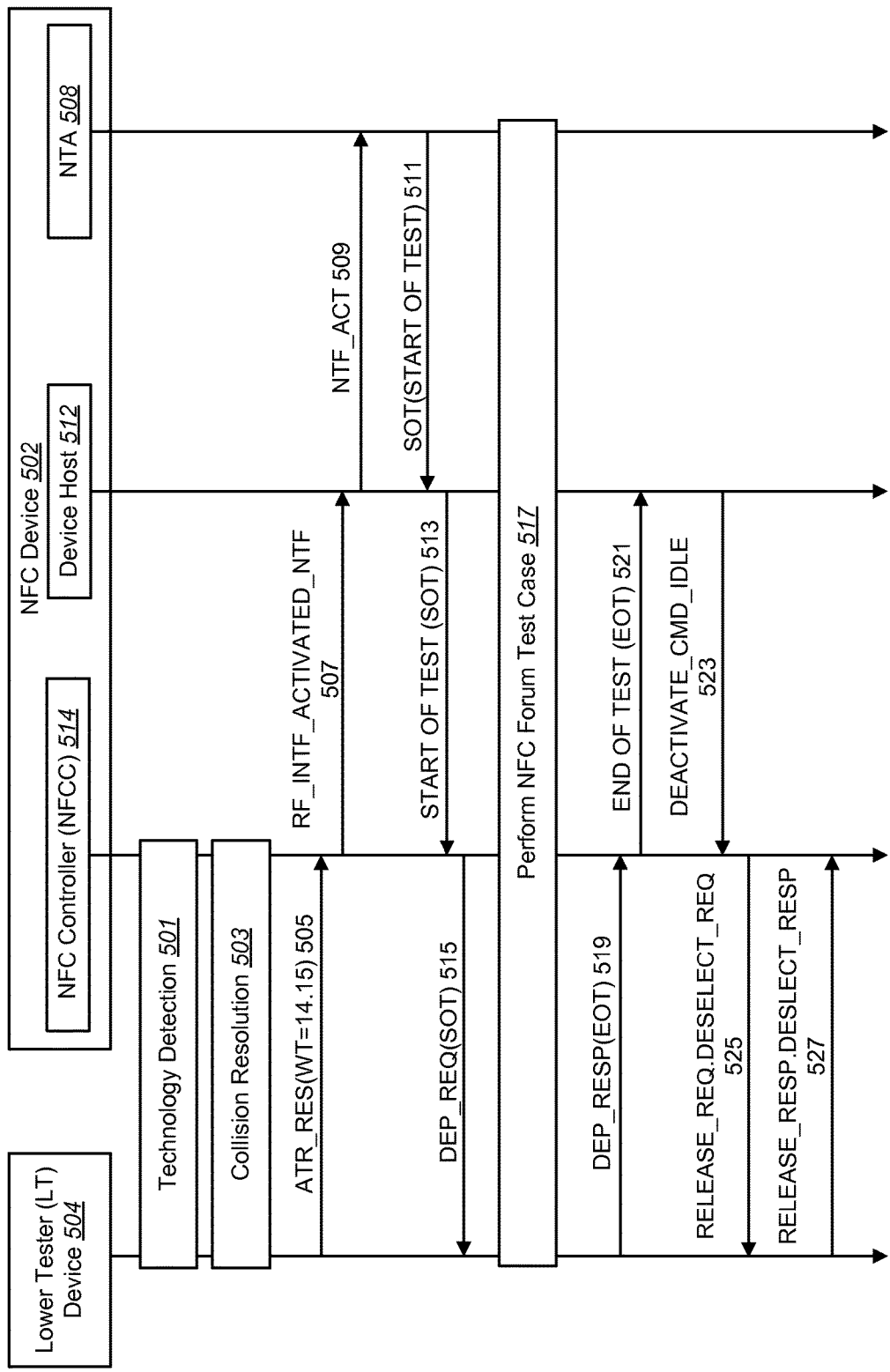
FIG. 5 is a sequence diagram illustrating performing NFC Forum test cases in automation.

FIG. 5 is a sequence diagram illustrating performing NFC Forum test cases 110 in automation. In particular, FIG. 5 illustrates one example of implementing NFC Forum test cases 110 with automation according to the described systems and methods.

As described above, a lower tester (LT) device 504 may communicate with an NFC device 502 that includes an NFC controller (NFCC) 514, a device host 512 and an NFC test application (NTA) 508. The LT device 504 and the NFCC 514 may initiate and perform an NFC Forum test case 110 by performing steps 501-517, as described in connection with FIG. 4.

Upon completing the NFC Forum test case 110*b*, the LT device 504 may send 519 an end of test (EOT) response 120 to the NFCC 514. The EOT response 120 may be formatted as a DEP response message (DEP_RESP(EOT)). The EOT response 120 may indicate that the LT device 104 has completed the NFC Forum test case 110*b*.

Upon receiving the EOT response 120, the NFCC 514 may send 521 an EOT message 122 to the device host 512. In response to receiving the EOT message 122, the device host 512 may send 523 a deactivate idle command (DEACTIVATE_CMD_IDLE) to the NFCC 514 instructing the NFCC 514 to enter idle mode.

The NFCC 514 may send 525 a deactivation request 124 (RELEASE_REQ.DESELECT_REQ) to the LT device 504. The deactivation request 124 may indicate to the LT device 504 that the NFC device 502 is ready to start the next NFC Forum test case 110*a* after completing the deactivation process with the LT device 504 and entering idle mode.

The LT device 504 may send 527 a deactivation response 126 (RELEASE_RESP.DESELECT_RESP) to the NFCC 514. The deactivation response 126 may indicate to the NFC device 502 that the LT device 504 is ready to start the next NFC Forum test case 110*b* after completing the deactivation process with the NFC device 502 and entering idle mode.

On completion of transition to idle mode, the NFC device 502 and the LT device 504 are ready to start the next NFC Forum test case 110 or procedure. The NFC device 502 and the LT device 504 may be ready to start the next NFC Forum test case 110 in milliseconds, which avoids a delay in execution in automation.

Figure 6:
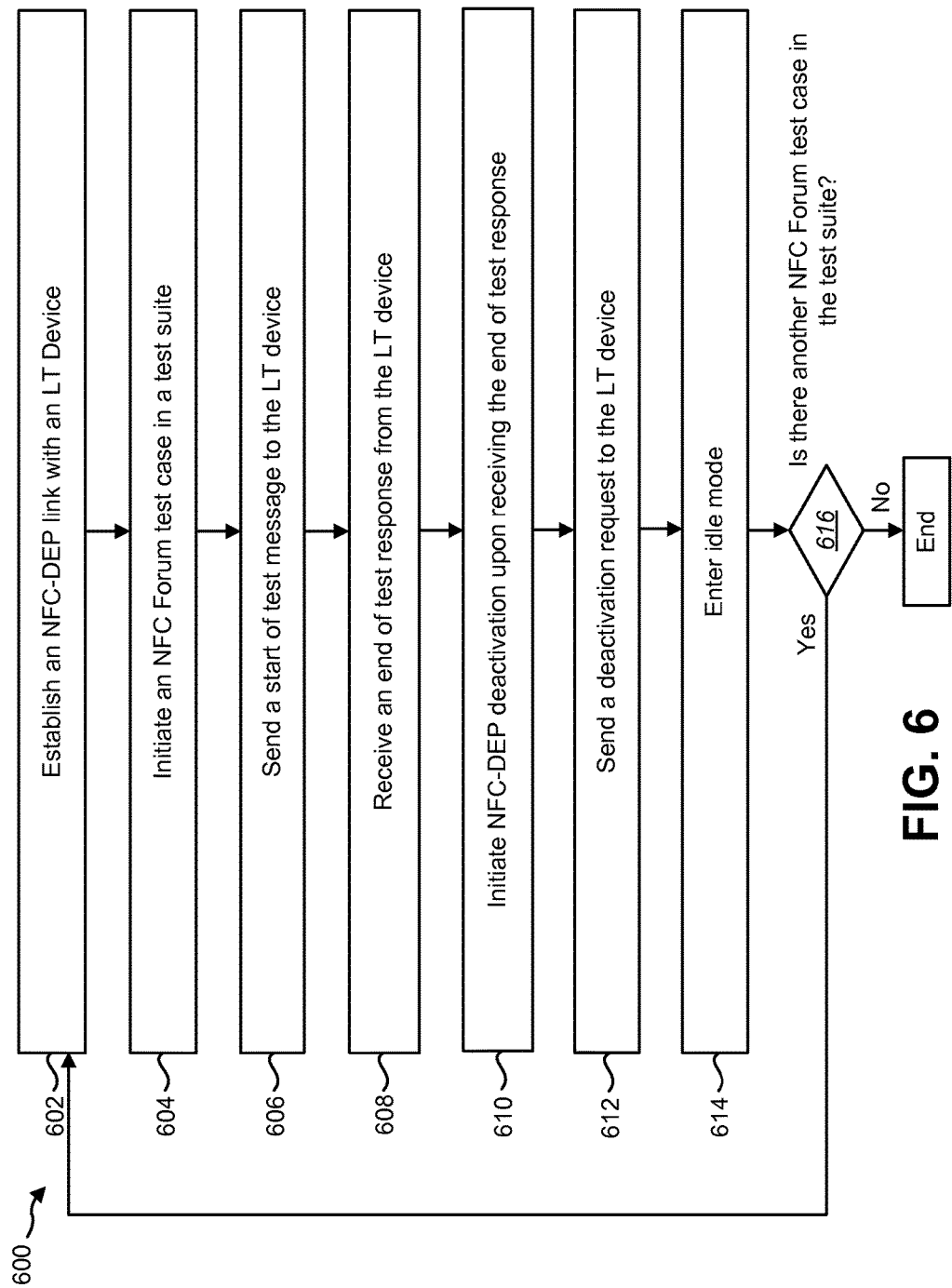
FIG. 6 is a flow diagram illustrating a detailed configuration of a method for performing NFC Forum test cases under automation by an NFC device.

FIG. 6 is a flow diagram illustrating a detailed configuration of a method 600 for performing NFC Forum test cases 110 under automation by an NFC device 102. The method 600 may be performed by the NFC device 102 to execute a test suite of NFC Forum test cases 110 with automation implemented.

The NFC device 102 may include an NFC controller (NFCC) 114 and a device host 112. An NFC test application (NTA) 108 may implement NFC Forum test cases 110 between the NFC device 102 and a lower tester (LT) device 104. The NFC device 102 and LT device 104 may establish 602 an NFC-DEP link.

The NFC device 102 may initiate 604 an NFC Forum test case 110*a* in the test suite. As described above, the test suite may include multiple NFC Forum test cases 110. The NFC device 102 may initiate 604 one of the NFC Forum test cases 110*a* in the test suite upon establishing the NFC-DEP link.

The NFC device 102 may send 606 a start of test (SOT) message 118 to the LT device 104. Upon receiving the SOT message 118, the LT device 104 may perform the NFC Forum test case 110*b*.

The NFC device 102 may receive 608 an end of test (EOT) response 120 from the LT device 104. Upon completing the NFC Forum test case 110*b*, the LT device 104 may send the EOT response 120 to the NFC device 102. The EOT response 120 may indicate completion of the NFC Forum test case 110*b* by the LT device 104.

The NFC device 102 may initiate 610 NFC-DEP deactivation upon receiving the EOT response 120. The NFC device 102 may send 612 a deactivation request 124 to the LT device 104. The deactivation request 124 may instruct the LT device 104 to release the NFC-DEP link. The deactivation request 124 may indicate to the LT device 104 that the NFC device 102 is ready to start the next NFC Forum test case 110*a* after completing the deactivation process with the LT device 104. Upon deactivating the NFC-DEP link, the NFC device 102 may enter 614 idle mode.

The NFC device 102 may determine 616 whether there is another NFC Forum test case 110 in the test suite. If there are one or more NFC Forum test cases 110 to be completed, the NFC device 102 may re-establish 602 an NFC-DEP link with the LT device 104 and initiate 604 the next NFC Forum test case 110. If there are no more NFC Forum test cases 110 in the test suite, the method 600 ends.

Figure 7:
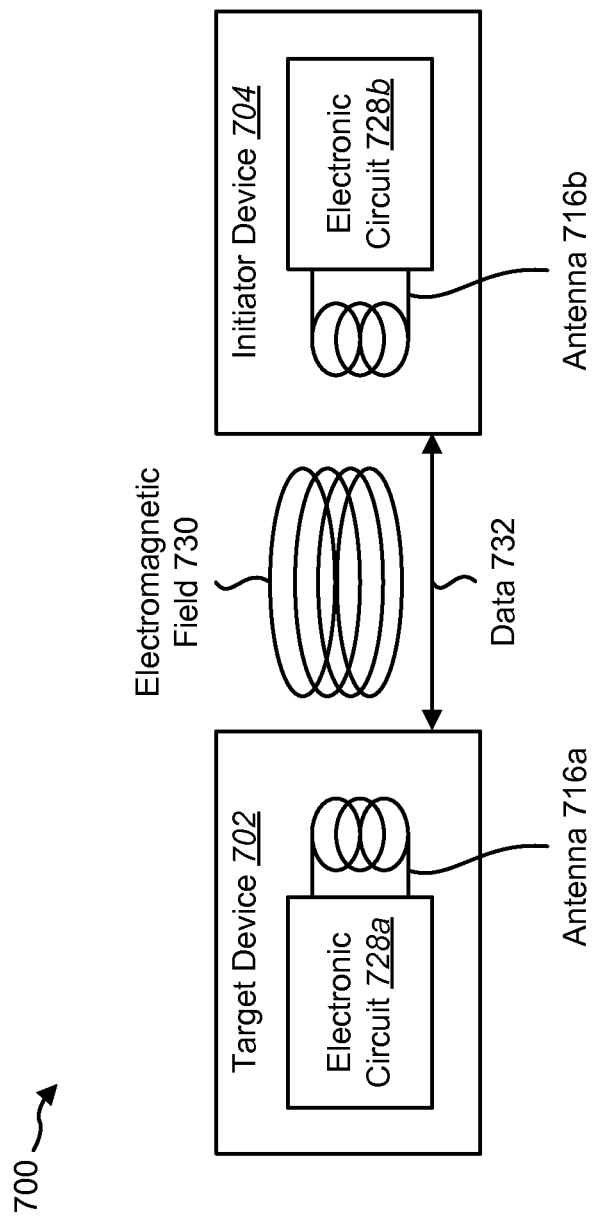
FIG. 7 is a block diagram illustrating one configuration of inductively coupled communication in a wireless communication system.

FIG. 7 is a block diagram illustrating one configuration of inductively coupled communication in a wireless communication system 700. A target device 702 and an initiator device 704 may operate according to near-field communication (NFC) protocols. The target device 702 may be implemented according to the NFC device 102 described in connection with FIG. 1. The initiator device 704 may be implemented according to the lower tester (LT) device 104 described in connection with FIG. 1. Each device 702, 704 may include an antenna 716*a-b* connected to an electronic circuit 728*a-b*. During operation, the combination of two NFC devices (i.e., the target device 702 and initiator device 704) may behave like a transformer.

NFC is an inductive coupling communication technology. The two NFC-capable devices 702, 704 may be separated by a distance. An alternating current may pass through a primary coil (i.e., the target device antenna 716*a*) and create an electromagnetic field 730 (which may also be referred to as a radio frequency (RF) field or radiated field). The electromagnetic field 730 may induce a current in the secondary coil (i.e., the initiator device antenna 716*b*). The initiator device 704 may use the electromagnetic field 730 transmitted by the target device 702 to power itself.

The configuration and tuning of both antennas 716*a-b* may determine the coupling efficiency from one device to the other device. During certain NFC transactions, the initiator device 704 may function as an initiator and the target device 702 may function as a target, which are roles defined in the NFC standards.

In one configuration, the NFC transmitter of one device and the NFC receiver of the other device are configured according to a mutual resonant relationship. When the resonant frequency of the NFC receiver and the resonant frequency of the NFC transmitter are very close, transmission losses between the NFC transmitter and the NFC receiver are minimal when the NFC receiver is located in the near-field of the radiated field.

An NFC device may include an NFC loop antenna 716. The NFC loop antenna 716 may provide a means for energy transmission and reception. As stated, an efficient energy transfer may occur by coupling a large portion of the energy in the near-field of a transmitting antenna 716 to a receiving antenna 716 rather than propagating most of the energy in an electromagnetic wave to the far field.

An NFC-capable device may obtain sufficient data 732 to allow for communications to be established. One form of communications that may be established is an international standards organization data exchange protocol (ISO-DEP) communication link. Another form of communications that may be established is NFC-DEP. Communications between the NFC devices may be enabled over a variety of NFC radio frequency (RF) technologies, including but not limited to, NFC-A, NFC-B, NFC-F, etc.

Figure 8:
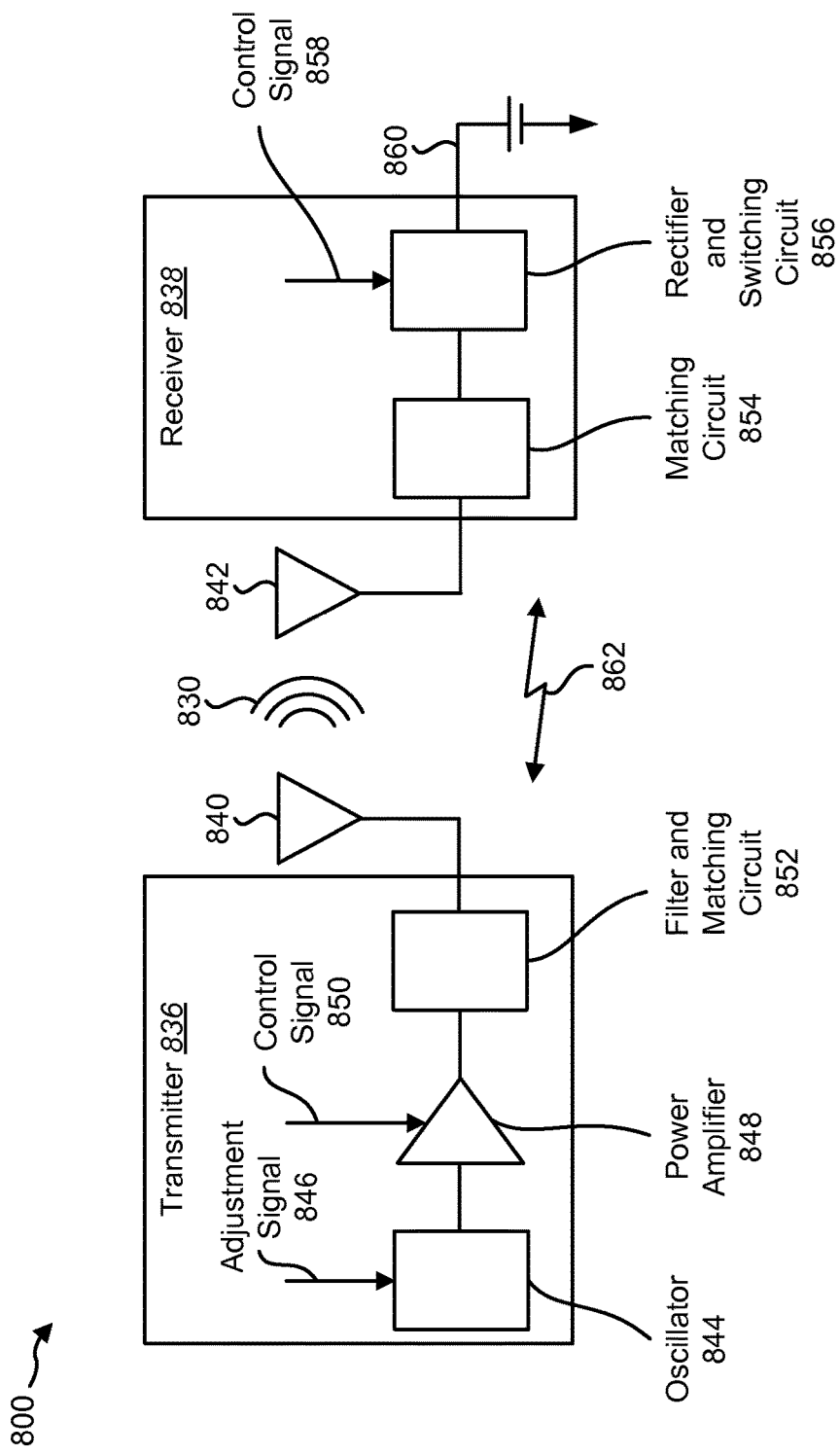
FIG. 8 shows a simplified schematic diagram of a near-field wireless communication system.

FIG. 8 shows a simplified schematic diagram of a near-field wireless communication system 800. The transmitter 836 includes an oscillator 844, a power amplifier 848 and a filter and matching circuit 852. The oscillator 844 is configured to generate a signal at a desired frequency, which may be adjusted in response to an adjustment signal 846. The oscillator 844 signal may be amplified by the power amplifier 848 with an amplification amount responsive to a control signal 850. The filter and matching circuit 852 may be included to filter out harmonics or other unwanted frequencies and match the impedance of the transmitter 836 to the transmit antenna 840. The transmit antenna 840 may transmit a radiated field 830 (also referred to as an electromagnetic field).

The receiver 838 may include a matching circuit 854 and a rectifier and switching circuit 856 to generate a DC power output 860 to charge a battery or power a device coupled to the receiver (not shown). The matching circuit 854 may be included to match the impedance of the receiver 838 to the receive antenna 842. The rectifier switching circuit 856 may be adjusted by a control signal 858. The receiver 838 and transmitter 836 may communicate on a separate communication channel 862 (e.g., Bluetooth, zigbee, cellular, etc.).

Figure 9:
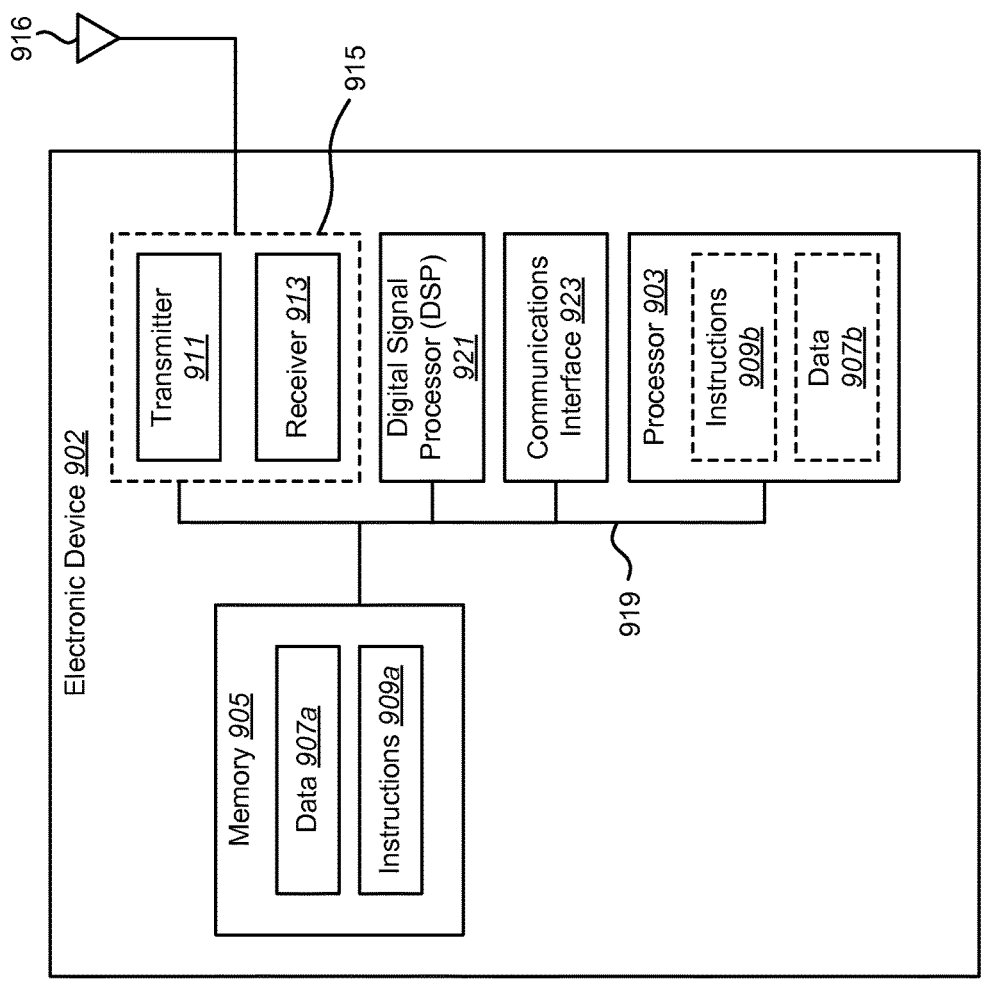
FIG. 9 illustrates certain components that may be included within an electronic device.

FIG. 9 illustrates certain components that may be included within an electronic device 902. The electronic device 902 may be an access terminal, a mobile station, a user equipment (UE), etc. For example, the electronic device 902 may be the NFC device 102 or the lower tester (LT) device 104 of FIG. 1.

The electronic device 902 includes a processor 903. The processor 903 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 903 may be referred to as a central processing unit (CPU). Although just a single processor 903 is shown in the electronic device 902 of FIG. 9, in an alternative configuration, a combination of processors (e.g., an ARM and DSP) could be used.

The electronic device 902 also includes memory 905 in electronic communication with the processor (i.e., the processor can read information from and/or write information to the memory). The memory 905 may be any electronic component capable of storing electronic information. The memory 905 may be configured as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 907a and instructions 909a may be stored in the memory 905. The instructions may include one or more programs, routines, sub-routines, functions, procedures, code, etc. The instructions may include a single computer-readable statement or many computer-readable statements. The instructions 909a may be executable by the processor 903 to implement the methods disclosed herein. Executing the instructions 909a may involve the use of the data 907a that is stored in the memory 905. When the processor 903 executes the instructions 909, various portions of the instructions 909b may be loaded onto the processor 903, and various pieces of data 907b may be loaded onto the processor 903.

The electronic device 902 may also include a transmitter 911 and a receiver 913 to allow transmission and reception of signals to and from the electronic device 902 via an antenna 916. The transmitter 911 and receiver 913 may be collectively referred to as a transceiver 915. The electronic device 902 may also include (not shown) multiple transmitters, multiple antennas, multiple receivers and/or multiple transceivers.

The electronic device 902 may include a digital signal processor (DSP) 921. The electronic device 902 may also include a communications interface 923. The communications interface 923 may allow a user to interact with the electronic device 902.

The various components of the electronic device 902 may be coupled together by one or more buses, which may include a power bus, a control signal bus, a status signal bus, a data bus, etc. For the sake of clarity, the various buses are illustrated in FIG. 9 as a bus system 919.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2-3 and FIG. 6 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method by a near-field communication (NFC) device, comprising:
   receiving, at an NFC controller, an end of test response from a lower tester (LT) device that indicates completion by the LT device of an NFC Forum test case;
   sending an end of test message from the NFC controller to a device host; and
   initiating, by the device host, a deactivation process for the LT device upon receiving the end of test message, wherein the deactivation process comprises releasing an NFC-data exchange protocol (DEP) link with the LT device and entering idle mode.

2. The method of claim 1, wherein the method is performed during NFC Forum test case execution under automation, wherein a test suite of NFC Forum test cases is executed with automation implemented.

3. The method of claim 1, wherein the end of test response is received from the LT device in response to sending a start of test message from the NFC device, wherein the LT device executes the NFC Forum test case upon receiving the start of test message and sends the end of test response upon completing the NFC Forum test case.

4. The method of claim 1, wherein the end of test response comprises a data exchange protocol (DEP) response end of transmission (DEP_RESP(EOT)) message.

5. The method of claim 1, wherein performing the NFC-DEP deactivation comprises sending a deactivation request to the LT device in response to receiving the end of test response from the LT device.

6. The method of claim 1, further comprising indicating to the LT device that the NFC device is ready to start a next NFC Forum test case upon completing the deactivation process with the LT device and entering idle mode.

7. The method of claim 1, wherein the NFC Forum test case comprises a test to verify that the NFC device is compliant with NFC Forum technical specifications.

8. A near-field communication (NFC) device, comprising:
   a processor;
   memory in electronic communication with the processor; and
   instructions stored in the memory, the instructions being executable by the processor to:
      receive, at an NFC controller, an end of test response from a lower tester (LT) device that indicates completion by the LT device of an NFC Forum test case;
      send an end of test message from the NFC controller to a device host; and
      initiate, by the device host, a deactivation process for the LT device upon receiving the end of test message, wherein the deactivation process comprises releasing an NFC-data exchange protocol (DEP) link with the LT device and entering idle mode.

9. The NFC device of claim 8, wherein the NFC device executes the NFC Forum test case under automation, wherein a test suite of NFC Forum test cases is executed with automation implemented.

10. The NFC device of claim 8, wherein the end of test response is received from the LT device in response to sending a start of test message from the NFC device, wherein the LT device executes the NFC Forum test case upon receiving the start of test message and sends the end of test response upon completing the NFC Forum test case.

11. The NFC device of claim 8, wherein the end of test response comprises a DEP_RESP(EOT) message.

12. The NFC device of claim 8, wherein the instructions executable to perform the NFC-DEP deactivation comprise instructions executable to send a deactivation request to the LT device in response to receiving the end of test response from the LT device.

13. The NFC device of claim 8, further comprising instructions executable to indicate to the LT device that the NFC device is ready to start a next NFC Forum test case upon completing the deactivation process with the LT device and entering idle mode.

14. The NFC device of claim 8, wherein the NFC Forum test case comprises a test to verify that the NFC device is compliant with NFC Forum technical specifications.

15. A method by a lower tester (LT) device, comprising:
   sending an end of test response to a near-field communication (NFC) device upon completion by the LT device of an NFC Forum test case;
   receiving a deactivation request from the NFC device based on the end of test response; and
   initiating a deactivation process with the NFC device upon receiving the deactivation request, wherein the deactivation process comprises releasing an NFC-data exchange protocol (DEP) link with the LT device and entering idle mode.

16. The method of claim 15, wherein the method is performed during NFC Forum test case execution under automation, wherein a test suite of NFC Forum test cases is executed with automation implemented.

17. The method of claim 15, wherein the end of test response is sent from the LT device in response to receiving a start of test message from the NFC device, wherein the LT device executes the NFC Forum test case upon receiving the start of test message and sends the end of test response upon completing the NFC Forum test case.

18. The method of claim 15, wherein the end of test response comprises a DEP_RESP(EOT) message.

19. The method of claim 15, further comprising indicating to the NFC device that the LT device is ready to start a next NFC Forum test case upon completing the deactivation process with the NFC device and entering idle mode.

20. The method of claim 15, wherein the NFC Forum test case comprises a test to verify that the NFC device is compliant with NFC Forum technical specifications.

21. A lower tester (LT) device, comprising:
   a processor;
   memory in electronic communication with the processor; and
   instructions stored in the memory, the instructions being executable by the processor to:
      send an end of test response to a near-field communication (NFC) device upon completion by the LT device of an NFC Forum test case;
      receive a deactivation request from the NFC device based on the end of test response; and
      initiate a deactivation process with the NFC device upon receiving the deactivation request, wherein the deactivation process comprises releasing an NFC-data exchange protocol (DEP) link with the LT device and entering idle mode.

22. The LT device of claim 21, wherein the LT device executes the NFC Forum test case under automation, wherein a test suite of NFC Forum test cases is executed with automation implemented.

23. The LT device of claim 21, wherein the end of test response is sent from the LT device in response to receiving a start of test message from the NFC device, wherein the LT device executes the NFC Forum test case upon receiving the start of test message and sends the end of test response upon completing the NFC Forum test case.

24. The LT device of claim 21, wherein the end of test response comprises a DEP_RESP(EOT) message.

25. The LT device of claim 21, further comprising instructions executable to indicate to the NFC device that the LT device is ready to start a next NFC Forum test case upon completing the deactivation process with the NFC device and entering idle mode.

26. The LT device of claim 21, wherein the NFC Forum test case comprises a test to verify that the NFC device is compliant with NFC Forum technical specifications.

* * * * *